(12) United States Patent
Yamahata et al.

(10) Patent No.: US 8,055,690 B2
(45) Date of Patent: Nov. 8, 2011

(54) DATA FILE MANAGEMENT APPARATUS, IMAGE FORMING APPARATUS, METHOD OF MANAGING A DATA FILE, DATA FILE MANAGEMENT PROGRAM AND PROGRAM RECORDING MEDIUM

(75) Inventors: Taketoshi Yamahata, Toyokawa (JP); Kenichi Matsumoto, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 459 days.

(21) Appl. No.: 11/200,063

(22) Filed: Aug. 10, 2005

(65) Prior Publication Data
US 2006/0265389 A1 Nov. 23, 2006

(30) Foreign Application Priority Data
May 17, 2005 (JP) .................................. 2005-143961

(51) Int. Cl.
*G06F 12/00* (2006.01)
*G06F 17/30* (2006.01)
(52) U.S. Cl. ........................................ 707/827; 707/823
(58) Field of Classification Search ................... None
See application file for complete search history.

(56) References Cited

U.S. PATENT DOCUMENTS

| | | | | |
|---|---|---|---|---|
| 5,220,657 A | * | 6/1993 | Bly et al. | 711/152 |
| 5,278,984 A | * | 1/1994 | Batchelor | 719/314 |
| 5,826,265 A | * | 10/1998 | Van Huben et al. | 707/8 |
| 5,862,346 A | * | 1/1999 | Kley et al. | 709/245 |
| 5,930,514 A | * | 7/1999 | Thompson et al. | 717/170 |
| 6,009,462 A | * | 12/1999 | Birrell et al. | 709/206 |
| 6,094,654 A | * | 7/2000 | Van Huben et al. | 707/8 |
| 6,199,116 B1 | * | 3/2001 | May et al. | 719/310 |
| 6,343,316 B1 | * | 1/2002 | Sakata | 709/213 |
| 6,430,598 B1 | * | 8/2002 | Dorrance et al. | 709/203 |
| 6,446,071 B1 | * | 9/2002 | Callaway et al. | 707/10 |

(Continued)

FOREIGN PATENT DOCUMENTS

JP 5-48811 2/1993

(Continued)

OTHER PUBLICATIONS

Notification of Reasons for Refusal dated Jul. 10, 2007, directed to counterpart JP application No. 2005-143961 (5 pages).

*Primary Examiner* — Pierre Vital
*Assistant Examiner* — Augustine Obisesan
(74) *Attorney, Agent, or Firm* — Morrison & Foerster LLP

(57) ABSTRACT

A data file management apparatus capable of avoiding the unauthorized deletion of a file shared by a plurality of users. In the apparatus connected to a network and having the function to store the data file in such as to be shared by the users, the address information of the joint file users permitted to share the data file are registered-while being related to the data file at the time of data file storage, and in response to a data file deletion request, a message to confirm the consent of the joint file users about the data file deletion is sent to the registered address information. Upon receiving a message returned from a joint file user not to consent to the data file deletion within a predetermined period from the confirming message transmission, the data file is not deleted, while the data file is deleted otherwise.

8 Claims, 12 Drawing Sheets

U.S. PATENT DOCUMENTS

| | | | |
|---|---|---|---|
| 6,493,725 B1 * | 12/2002 | Iwai et al. | 1/1 |
| 6,529,905 B1 * | 3/2003 | Corsberg et al. | 707/8 |
| 6,973,549 B1 * | 12/2005 | Testardi | 711/150 |
| 7,085,772 B1 * | 8/2006 | Sternemann | 707/103 R |
| 2002/0032714 A1 * | 3/2002 | Monobe | 709/100 |
| 2002/0156895 A1 * | 10/2002 | Brown | 709/226 |
| 2002/0199071 A1 * | 12/2002 | Kitamura et al. | 711/152 |
| 2003/0071900 A1 * | 4/2003 | Aoyagi | 348/207.1 |
| 2003/0217164 A1 * | 11/2003 | Cai et al. | 709/229 |
| 2003/0233364 A1 * | 12/2003 | Nakao et al. | 707/100 |
| 2004/0030728 A1 * | 2/2004 | Ishmael et al. | 707/200 |
| 2004/0068524 A1 * | 4/2004 | Aboulhosn et al. | 707/200 |
| 2004/0122873 A1 * | 6/2004 | Wright et al. | 707/205 |
| 2004/0252821 A1 * | 12/2004 | Chiczewski et al. | 379/207.11 |
| 2005/0131902 A1 * | 6/2005 | Saika | 707/10 |
| 2005/0198293 A1 * | 9/2005 | Takabayashi et al. | 709/225 |
| 2005/0289237 A1 * | 12/2005 | Matsubara et al. | 709/232 |
| 2006/0173940 A1 * | 8/2006 | Guntupalli et al. | 707/206 |

FOREIGN PATENT DOCUMENTS

| | | |
|---|---|---|
| JP | 7-244637 | 9/1995 |
| JP | 10-23232 | 1/1998 |
| JP | 2003-44362 | 2/2003 |
| JP | 2004-240511 | 8/2004 |

* cited by examiner

Fig. 4

| ONE-TOUCH NO. | ONE-TOUCH NAME | BOX NAME | DELETION CONFIRMING MAIL ADDRESS |
|---|---|---|---|
| 0 | yamahata | Confidential | yama@konicaminolta.jp<br>matsu@konicaminolta.jp<br>ima@konicaminolta.jp |
| 1 | iida | Tizai | iida@konicaminolta.jp<br>ima@konicaminolta.jp |
| 2 | imamura | NM | ima@konicaminolta.jp<br>kawabe@konicaminolta.jp<br>sakai@konicaminolta.jp<br>kondo@konicaminolta.jp<br>naka@konicaminolta.jp<br>takagi@konicaminolta.jp |
| 3 | sugiura | Confidential | sugi@konicaminolta.jp<br>matsu@konicaminolta.jp |
| ⋮ | ⋮ | ⋮ | ⋮ |

Fig. 5

| FILE NO. | FILE NAME | DELETION CONFIRMING MAIL ADDRESS |
|---|---|---|
| 0 | 20040901134927.tif | yama@konicaminolta.jp<br>matsu@konicaminolta.jp<br>ima@konicaminolta.jp |
| 1 | 20040914082155.pdf | sugi@konicaminolta.jp<br>matsu@konicaminolta.jp |
| 2 | 20040924180301.tif | yama@konicaminolta.jp<br>matsu@konicaminolta.jp<br>ima@konicaminolta.jp |
| ⋮ | ⋮ | ⋮ |

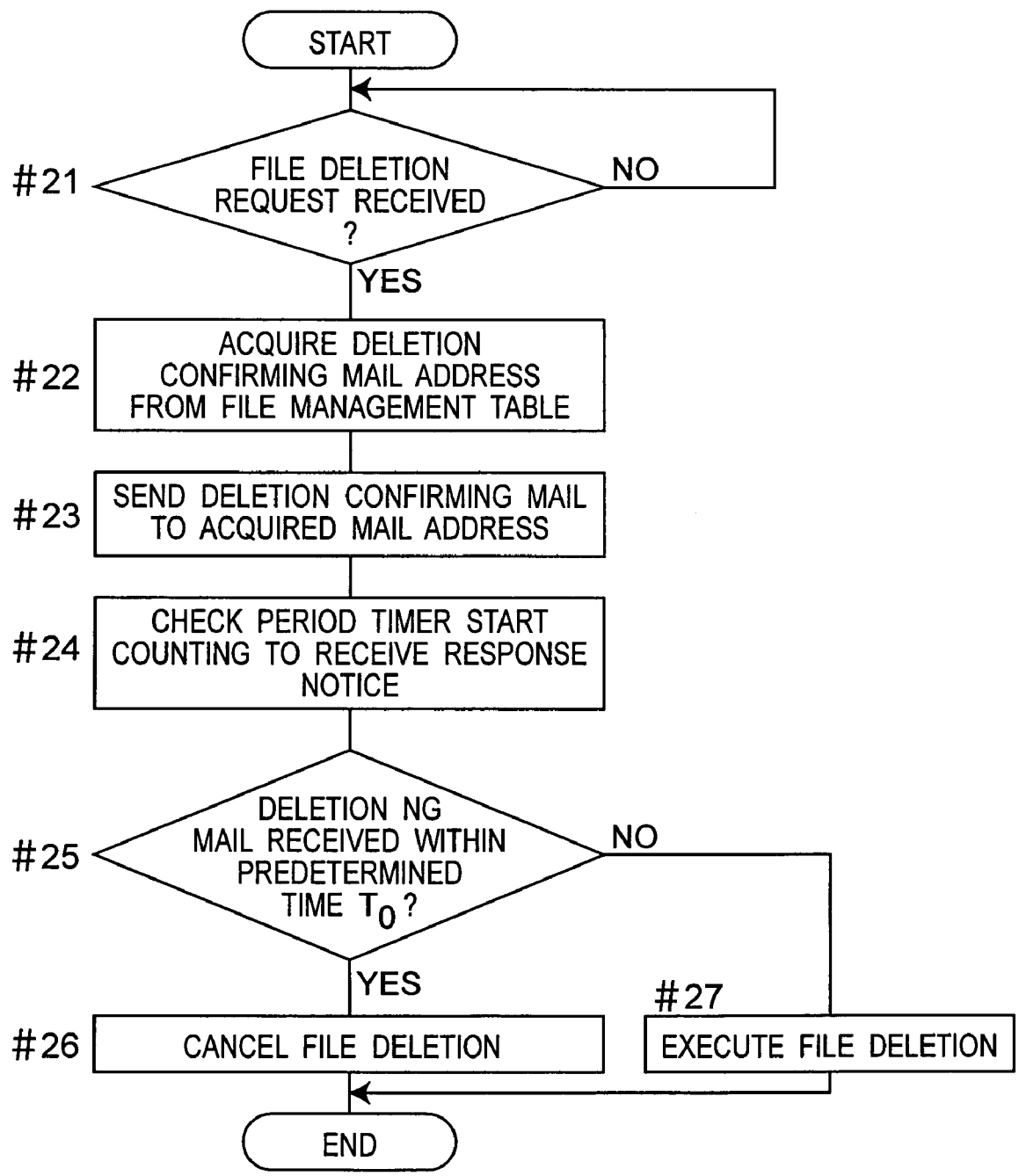

Fig. 8

| FILE NO. | FILE NAME | DELETION CONFIRMING MAIL ADDRESS | FILE-ACCESSED JOINT USER MAIL ADDRESS |
|---|---|---|---|
| 0 | 20040901134927.tif | yama@konicaminolta.jp<br>matsu@konicaminolta.jp<br>ima@konicaminolta.jp | matsu@konicaminolta.jp |
| 1 | 20040914082155.pdf | sugi@konicaminolta.jp<br>matsu@konicaminolta.jp | sugi@konicaminolta.jp |
| 2 | 20040924180301.tif | yama@konicaminolta.jp<br>matsu@konicaminolta.jp<br>ima@konicaminolta.jp | yama@konicaminolta.jp<br>matsu@konicaminolta.jp |
| ... | ... | ... | ... |

Fig.9

| DELETION SUSPENDED FILE NO. | BOX NAME | FILE NAME | FILE DELETION SUSPENDED DAY | NEXT DELETION EXECUTION DAY/HOUR |
|---|---|---|---|---|
| 0 | Confidential | 20040813101442.pdf | 2004/09/20 | 2004/09/25_15:00 |
| 1 | Confidential | 20040825185532.tif | 2004/09/23 | 2004/09/28_15:00 |
| 2 | Tizai | 20040901220001.tif | 2004/09/24 | 2004/09/29_15:00 |
| ... | ... | ... | ... | ... |

Fig.12

| ONE-TOUCH NO. | ONE-TOUCH NAME | BOX NAME | ACCUMULATOR MAIL ADDRESS | JOINT FILE USER MAIL ADDRESS |
|---|---|---|---|---|
| 0 | yamahata | Confidential | yama@konicaminolta.jp | yama@konicaminolta.jp<br>matsu@konicaminolta.jp<br>ima@konicaminolta.jp |
| 1 | iida | Tizai | iida@konicaminolta.jp | iidai@konicaminolta.jp<br>matsu@konicaminolta.jp |
| 2 | imamura | NM | ima@konicaminolta.jp | ima@konicaminolta.jp<br>kawabe@konicaminolta.jp<br>sakai@konicaminolta.jp<br>kondo@konicaminolta.jp<br>naka@konicaminolta.jp<br>takagi@konicaminolta.jp |
| 3 | sugiura | Confidential | sugi@konicaminolta.jp | sakai@konicaminolta.jp<br>sugi@konicaminolta.jp |
| ... | ... | ... | ... | ... |

Fig. 13

| FILE NO. | FILE NAME | ACCUMULATOR MAIL ADDRESS | JOINT FILE USER MAIL ADDRESS | FILE-ACCESSED JOINT FILE USER MAIL ADDRESS |
|---|---|---|---|---|
| 0 | 20040901134927.tif | yama@konicaminolta.jp | yama@konicaminolta.jp<br>matsu@konicaminolta.jp<br>ima@konicaminolta.jp | yama@konicaminolta.jp<br>matsu@konicaminolta.jp |
| 1 | 20040914082155.pdf | iida@konicaminolta.jp | iida@konicaminolta.jp<br>matsu@konicaminolta.jp | iidai@konicaminolta.jp |
| 2 | 20040924180301.tif | ima@konicaminolta.jp | ima@konicaminolta.jp<br>kawabe@konicaminolta.jp<br>sakai@konicaminolta.jp<br>kondo@konicaminolta.jp<br>naka@konicaminolta.jp<br>takagi@konicaminolta.jp | ima@konicaminolta.jp<br>kawabe@konicaminolta.jp |
| ... | ... | ... | ... | ... |

DATA FILE MANAGEMENT APPARATUS, IMAGE FORMING APPARATUS, METHOD OF MANAGING A DATA FILE, DATA FILE MANAGEMENT PROGRAM AND PROGRAM RECORDING MEDIUM

BACKGROUND OF THE INVENTION

This application is based on applications No. 2005-143961 filed in Japan, the contents of which is hereby incorporated by reference.

1. Field of the Invention

This invention relates to a data file management apparatus, such as an image forming apparatus, having the function to accumulate the data file shared by a plurality of users, a data file management program and a recording medium for recording the program.

2. Description of the Related Art

In an image forming apparatus such as a copier or a multifunction peripheral, an image file such as the scan data is accumulated in a storage unit such as a hard disk drive and shared by a plurality of users either in such a manner that the file is accumulated in a public box accessible without a password or in such a manner that the file is accumulated in a private box capable of being accessed using a password distributed to the users sharing the file (hereinafter sometimes referred to as the joint file users). In any case, the file accumulated may be deleted by someone (who may be one of the joint file users) without the consent of all the joint file users or in spite of the presence of a joint file user who has yet to access the file.

A conventional technique to share a file among a plurality of users is known in which a deadline is set to hold the file in the system. In the presence of some user who has not accessed the file before the deadline, however, the file is unconditionally deleted. Japanese Patent Laid-open Publication No. 2004-240511, on the other hand, discloses a technique in which when a file is accumulated, the mail address of the accumulator is registered, and at the time of file deletion, a mail seeking the consent of the accumulator about the proposed deletion is sent to the registered mail address. In the case where a response mail indicating the consent to the proposed deletion is returned, the file is deleted, while otherwise, i.e. in the case where a response mail not consenting to the proposed deletion is received or no response mail is received, then the file is deleted after being sent to the mail address.

In the technique disclosed in Japanese Patent Laid-open Publication No. 2004-240511, however, the mail seeking the deletion is sent only to the file accumulator, and therefore the file is still liable to be deleted by the file accumulator without the consent of all the joint file users or in the presence of a joint file user having not accessed the file.

SUMMARY OF THE INVENTION

This invention has been developed in view of the technical problem described above, and the object thereof is to provide a data file management apparatus, an image forming apparatus, a method of managing a data file, a data file management program and a program recording medium, whereby the unauthorized deletion of a data file shared by a plurality of users is avoided while at the same time making it possible to promote the data file access by the joint file users.

In one aspect of the present invention, there is provided a data file management apparatus connected to a network and having the function of accumulating a data file that can be shared by a plurality of users, comprising: a register for registering an address information of a plurality of joint-file users permitted to share the data file while being related to the data file at the time of accumulating the data file; a transmitter for transmitting a message to confirm the consent of the joint file users about the data file deletion to the address information registered in the register in response to a data file deletion request; and a deletion controller for not executing the data file deletion in the case where a message not consenting to the deletion of the data file is returned from the joint file user within a predetermined period from the message transmission by the transmitter and executing the data file in the other cases.

In the data file management apparatus, the transmitter may transmit the message confirming the consent of the joint file users about the data file deletion only to the address information of the joint file users who have not yet accessed the data file to be deleted. Also, the transmitter, upon receipt of the message not consenting to the data file deletion from the joint file users and upon lapse of a predetermined length of time from the receipt, may transmit the message again to confirm the consent of the joint file users about the data file deletion. Furthermore, the transmitter may progressively shorten a timing of transmitting each message to confirm the consent of the joint file users about the data file deletion. Still further, the transmitter may transmit a data file to be deleted to the sender of the message not consenting to the data file deletion, and the deletion controller may delete the data file after the transmitter transmits the data file to be deleted.

In another aspect of the present invention, there is provided a data file management apparatus connected to a network and having the function to accumulate a data file that can be shared by a plurality of users, comprising: a register for registering an address information of a plurality of joint file users permitted to share the data file together with the address information of a data file accumulator while being related to the data file at the time of accumulating the data file; a memory for recording, after the data file accumulation, selected one of the joint file users who have accessed the data file and the joint file users who have yet to access the data file; and a transmitter for transmitting, to the address information of the data file accumulator registered in the register, the address information of the joint file users who have not accessed the data file as determined by the information recorded in the memory and a message to the effect that the joint file users have not accessed the data file.

In the data file management apparatus, the transmitter may attach the data file to be deleted to the message transmitted to the address information of the data file accumulator registered in the register.

Furthermore, in other aspect of the present invention, there is provided an image forming apparatus in which an image data file is generated by reading an original document, the apparatus being connected to a network and having the function of accumulating the image data file that can be shared by a plurality of users, comprising: a register for registering an address information of a plurality of joint file users permitted to share the image data file while being related to the image data file at the time of accumulating the image data file; a transmitter for transmitting a message to confirm the consent of the joint file users about the image data file deletion to the address information registered in the register in response to an image data file deletion request; and a deletion controller for not executing the image data file deletion in the case where a message not consenting to the deletion of the image data file is returned from the joint file user within a predetermined period from the message transmission by the transmitter and executing the image data file in the other cases.

Still further, in other aspect of the present invention, there is provided a method of managing a data file in an apparatus connected to a network and having the function of accumulating a data file that can be shared by a plurality of users, the method comprising the steps of: registering an address information of a plurality of joint file users permitted to share the data file while being related to the data file at the time of the data file accumulation; transmitting a message to confirm the consent of the joint file users about the data file deletion to the registered address information in response to a data file deletion request; and not executing the data file deletion in the case where a message not consenting to the data file deletion is returned from the joint file user within a predetermined period from the confirming message transmission and executing the data file deletion otherwise.

Still further, in other aspect of the present invention, there is provided a data file management program for a data file management apparatus connected to a network and having the function of accumulating a data file that can be shared by a plurality of users, comprising the steps of: registering an address information of a plurality of joint file users permitted to share the data file while being related to the data file at the time of the data file accumulation; transmitting a message to confirm the consent of the joint file users about the data file deletion to the registered address information in response to a data file deletion request; and not executing the data file deletion in the case where a message not consenting to the data file deletion is returned from the joint file user within a predetermined period from the confirming message transmission and executing the data file deletion otherwise.

Still further, in other aspect of the present invention, there is provided a recording medium for recording a data file management program in a data file management apparatus connected to a network and having the function of accumulating a data file that can be shared by a plurality of users, comprising the steps of: registering an address information of a plurality of the joint file users permitted to share the data file while being related to the data file at the time of the data file accumulation; transmitting a message to confirm the consent of the joint file users about the data file deletion to the registered address information in response to a data file deletion request; and not executing the data file deletion in the case where a message not consenting to the data file deletion is returned from a joint file user within a predetermined period from the confirming message transmission and executing the data file deletion otherwise.

According to the present invention, in response to a data file deletion request, a message to acquire the consent of the joint file users about the proposed data file deletion is sent to the address information of each joint file users in registration, and in the case where a message not consenting to the data file deletion is received, the proposed data file deletion is canceled. Therefore, the data file shared by a plurality of users is prevented from being deleted without consent. Also, the fact that the message to seek the consent to the deletion of the data file is sent to each joint user promotes the use of the data file by the joint file users who have yet to access the data file.

Also, according to the present invention, a message to seek the consent of the joint file users about the deletion of the data file is sent, in response to a data file deletion request, only to the joint file users who have yet to access the file. Therefore, the message is prevented from being wastefully sent from the system. Further, the joint file users who have already accessed the data file are not required to take the trouble of confirming the message.

Further, according to the present invention, upon receipt of the message not consenting to the deletion of a data file, the deletion of the data file is suspended, and upon the lapse of a predetermined time length from the suspension, a message to seek the consent of the joint file users about the deletion of the data file is sent again. Therefore, the data file deletion is promoted, and the burden on the recording means of the system is reduced.

Furthermore, according to the present invention, in the case where a message to seek the consent of the joint file users about the deletion of the data file is sent repeatedly, the deadline for suspending the data file deletion is progressively shortened. Therefore, the data file can be deleted within a shorter period of time.

In addition, according to the present invention, the joint file users who have yet to access the data file can positively acquire the data file.

Further, according to the present invention, the deletion of the data file is accompanied by a notification from the system to the file accumulator that some joint file users have yet to access the data file, together with their address information. After that, therefore, the file accumulator can notify the particular joint file users of the data file deletion and if required, can supply the data file to be deleted. Thus, the joint file users who have not yet accessed the data file can acquire the data file.

What is more, according to the present invention, the data file to be deleted is attached to the notification from the system to the file accumulator. Therefore, the file accumulator can positively provide the data file to the joint file users who have yet to access the data file.

BRIEF DESCRIPTION OF THE DRAWINGS

FIG. 4 shows a one-touch registration management table configured of the MFP.

FIG. 5 shows a file management table configured of the MFP.

FIG. 7 is a flowchart showing the data file deletion process executed by the MFP.

FIG. 8 shows a file management table configured of the MFP according to another embodiment (first modification) of the invention.

FIG. 9 shows a deletion suspension file management table configured of the MFP according to still another embodiment (second modification) of the invention.

FIG. 12 shows a one-touch registration management table configured of the MFP according to a still further embodiment (fifth modification) of the invention.

FIG. 13 shows a file management table configured of the MFP according to a yet further embodiment (sixth modification) of the invention.

DESCRIPTION OF THE PREFERRED EMBODIMENTS

An embodiment of the invention is explained below with reference to the accompanying drawings. According to this embodiment, a multifunction peripheral (hereinafter referred to as a MFP) is employed as a data file management system described in the claims.

Figure 1:
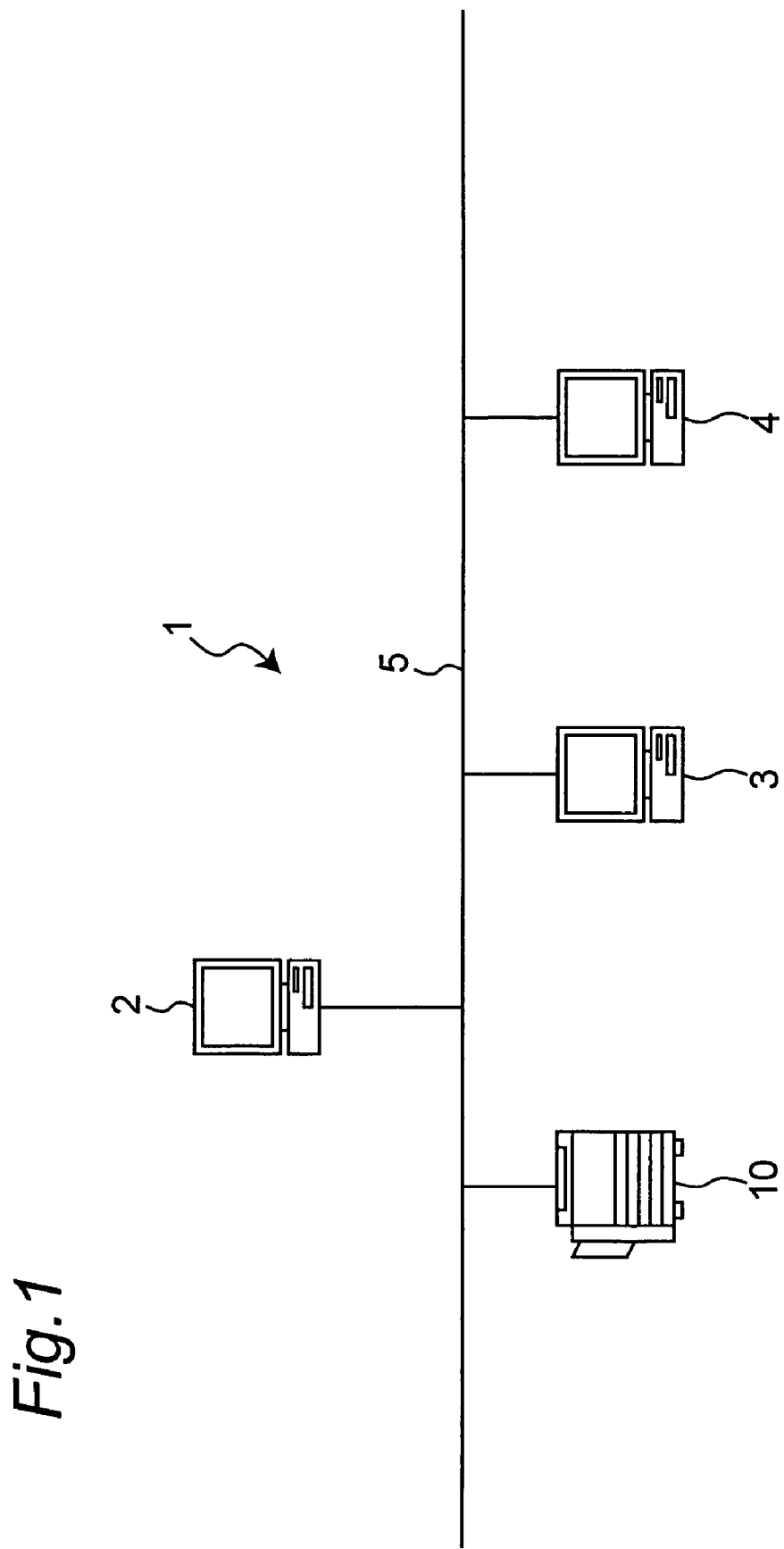
FIG. 1 is a diagram schematically showing a configuration of a network including terminals and a MFP according to an embodiment of the invention.

FIG. 1 is a diagram schematically showing a network configuration including a plurality of terminals and a MFP according to an embodiment of the invention. The network 1 includes a plurality of terminals 2, 3, 4 and a MFP 10 having a plurality of functions as a printer, a facsimile, a copier and a scanner. These component parts are connected in a manner capable of transmitting and receiving data through a network bus 5. In the network 1, the text data and the image data, for example, processed at the terminals 2, 3, 4 are transmitted to the MFP 10, in which they are printed or stored. Also, the job data prepared by the MFP 10 reading an original can be transmitted, and displayed or stored in the terminals 2, 3, 4.

Also, though not shown, the network 1 may be connected to the internet through the network bus 5. In such a case, the job data prepared based on the original is transmitted from the MFP 10 to a remote terminal on another network, for example, through the internet, or the job data can be received from a remote terminal through the internet and printed out. The network 1 actually includes, though not shown in FIG. 1, also other components such as a proxy server, a mail server or a router.

Figure 2:
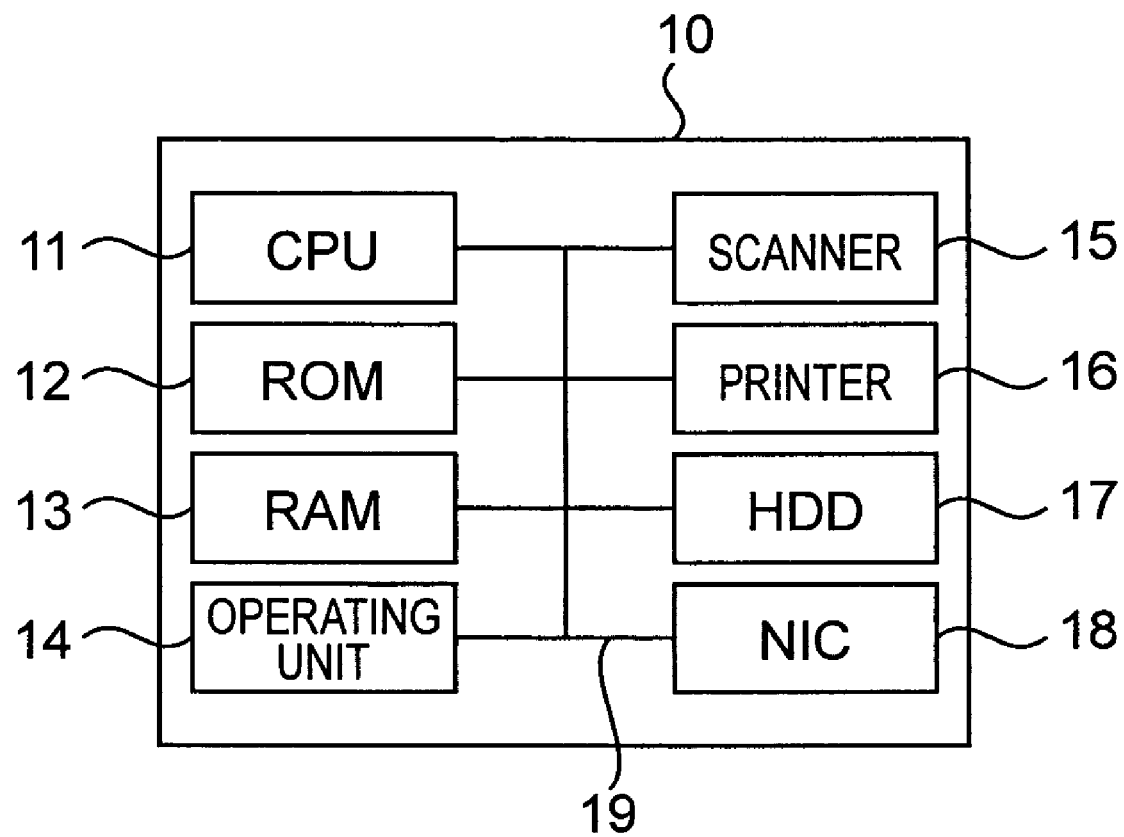
FIG. 2 is a diagram showing the basic configuration of the MFP.

FIG. 2 is a block diagram showing a basic configuration of the MFP 10. The MFP 10 basically includes a CPU 11 for controlling the internal component parts of the MFP 10 by executing various instructions based on a predetermined program, a ROM 12 for storing the program providing the basis of the control operation of the CPU 11, a RAM 13 for temporarily storing the job data transmitted from an external source or a work area required to execute the program, an operating unit 14 having a touch display panel by way of which the user can operate the system and input various settings, a scanning unit 15 for reading the original and preparing the image data, a printing unit 16 for printing the appropriate paper based on the job data, a hard disk drive (HDD) 17 for storing various job data transmitted from an external source or the image data from the original read by the scanning unit 15, and a network interface card (NIC) 18 providing an interface for transmitting or receiving the job data or the like to or from an external source. These component parts are connected to each other through a bus 19 in such a manner as to be able to transmit and receive the data.

In the MFP 10, the image data (hereinafter referred to as the scan data) prepared by reading the original through the scanning unit 15 are handled in any of various modes including a scan-to-HDD mode in which the scan data are stored and managed by file in the hard disk drive 17, a scan-to-FTP mode in which the scan data is uploaded to a designated FTP server, a scan-to-SMB mode in which the scan data is transmitted directly to a common folder set in the terminals 2, 3, 4, and a scan-to-Email mode in which the scan data is sent to a designated mail address as a file attached to the electronic mail. The job data such as the image data and the text data transmitted from the terminals 2, 3, 4 for print output can be stored in the hard disk drive 17. These job data, like the scan data, can be stored and managed by the hard disk drive 17 by file. The data stored and managed by the file in the hard disk drive 17 are hereinafter referred to as the "data file".

A plurality of boxes each specified by unique directory information as a data file storage are registered in the hard disk drive 17. Each data file is stored in one of these boxes. A new box can be set as required. The user desirous of storing the data file in the hard disk drive 17 (hereinafter referred to as the file accumulator) selects one of preset boxes or a newly set box before executing such a job as reading the original through the scanning unit 15. Once the file accumulator issues an instruction to execute a job, the data file acquired by the execution of the job is accumulated in the selected box. In the MFP 10, a name arbitrarily set by the user (one-touch name) can be related to each box to permit the user to select the desired box readily to store the data file. As a result, the user can select the desired box simply by selecting one of the one-touch names listed on the display-panel of the operating unit 14. This function to select a one-touch name and store the data file in a predetermined box is called the "one-touch registration function" as well known. This one-touch registration function is not limited to the case in which the data file is stored in the hard disk drive 17 only by selecting a one-touch name, but applicable also to the function of the scan-to-Email or scan-to-FTP mode in which a mail with a data file attached thereto is transmitted to a designated mail address or uploaded to a designated FTP server.

The data file accumulated in each box of the hard disk drive 17 can be shared by a number of unspecified users. Nevertheless, the users that can share the data file (hereinafter referred to as the joint file users) can be limited depending on an appropriate setting. In order to limit the joint file users, each joint file user is assigned a password to access the data file and using this password, can acquired the data file. The MFP 10 is designed to avoid the unauthorized deletion of and promote the access by the joint file users to the data file which have not yet been accessed by some joint file users and accumulated and managed in a manner to be shared by specified users in a private box (the box requiring the password for access) and a public box (the box requiring no password for access) in the hard disk drive 17.

Specifically, in the case where the file accumulator selects a box set in the MFP 10 in which the data file is to be stored, the address information (the mail address in this case) which is contact address of the file accumulator and other joint file users can be set and registered as related to the data file to be accumulated. In response to a request for deletion of the data file accumulated in a box, a mail to seek the consent to the data file deletion (hereinafter referred to as the deletion confirming mail) is sent to the mail address of the joint file user related to the particular data file, and upon receipt of a mail rejecting the consent to the data file deletion (hereinafter referred to as the deletion NG mail) from the destination of the deletion confirming mail within a predetermined period, the data file deletion is not executed. Otherwise, i.e. in the case where a mail giving a consent to delete the data file (hereinafter referred to as the deletion OK mail) is returned or no return mail is received, on the other hand, the data file is deleted.

According to this embodiment, at the time of selecting a box constituting a data file storage, the mail addresses of the file accumulator and the other joint file users can be set directly from the operating unit 14 of the MFP or remotely using the Web browser from the terminals 2, 3, 4 connected to the network 1. In carrying out the latter method, the conventional MFP management technique using the Web browser can be employed in which status of use for the MFP 10 is confirmed or the setting of the printing parameters is managed by transmitting and receiving the information to and from the MFP 10 through the network 1.

Figure 3:
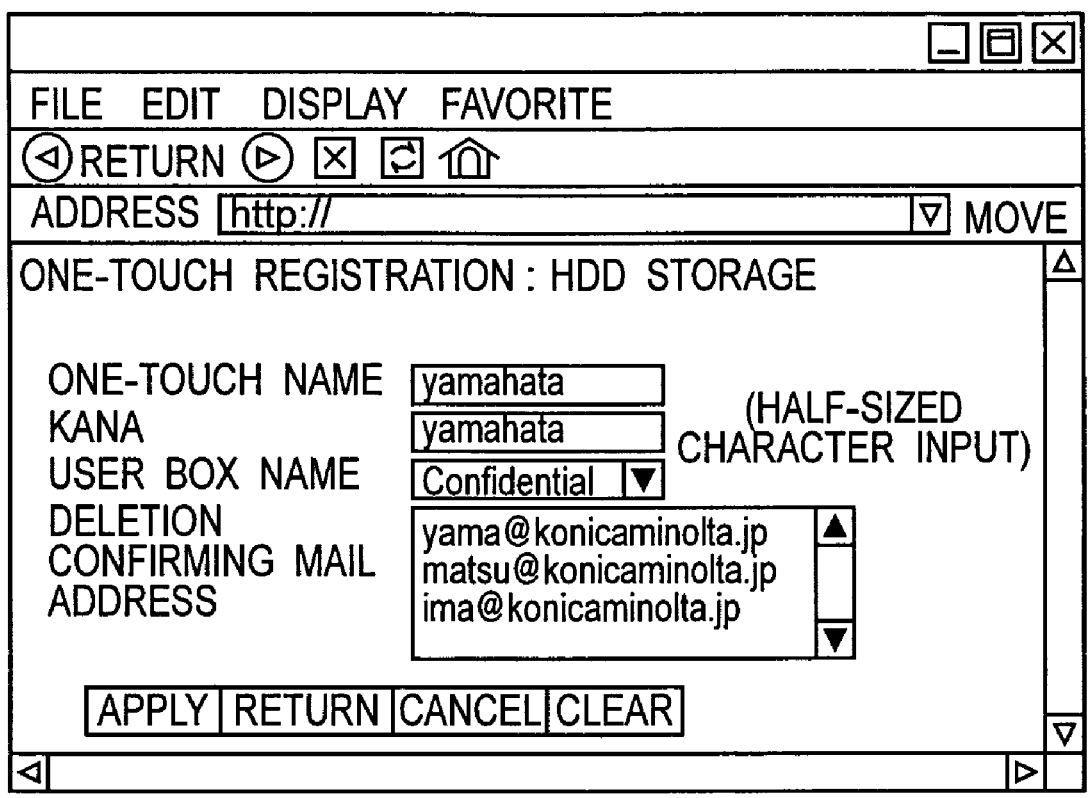
FIG. 3 is a diagram showing a setting screen displayed at a terminal to set the mail address of a file accumulator and a joint file user at the time of selection of a box providing a data file storage.

As long as the data can be transmitted to and received from the MFP 10 connected to the network 1, a setting screen as shown in FIG. 3 can be displayed on the monitor display of each terminal 2, 3, 4 to set the mail addresses of the file accumulator and the join file users in response to selecting the box constituting the data file storage upon setting the one-touch registration function. This setting screen includes the items adapted to be arbitrarily set by the file accumulator, such as "one-touch name", "kana (Japanese phonetic transcription)", "user box name" and "deletion confirming mail address". Thus, a plurality of setting input boxes corresponding to the items are provided.

The "one-touch name" can be set arbitrarily by the user as a name used for selecting the box on which the one-touch registration function is set. The "one-touch name" thus set by file accumulator is registered as related to the "user box name" of the box providing the data file storage in the MFP 10. In selecting the box in the MFP 10, the "one-touch name" is displayed selectably on the display panel of the operating unit 14 as a list with the one-touch names set by the other file accumulators in the past. Each file accumulator, by selecting the "one-touch name" set by oneself, can select the desired box as a data file storage. Also, the "kana" represents phonetic transcription of the "one-touch name". In the setting screen shown in FIG. 3, "yamahata" is input as a one-touch name and so as a "kana".

Further, the "user box name" is defined as a name specifying a box making up a data file storage. In the setting screen shown in FIG. 3, the names set in the existing boxes are displayed selectably in a pulldown menu. The selected "user box name" is registered as related to the "one-touch name" in the MFP 10. In this case, the user box name "Confidential" is selected, and registered as related to the one-touch name "yamahata".

Finally, the "deletion confirming mail address" is the address information indicating the contact address of the file accumulator and the other joint file users. The deletion confirming mail address thus set by file accumulator is registered as related to the data file to be stored in the MFP 10. In FIG. 3, as the deletion confirming mail address, "yama@konicaminolta.jp", "matsu@konicaminolta.jp" and "ima@konicaminolta.jp" are set to be registered as related to the data file to be accumulated. The address "yama@konicaminolta.jp" is the mail address of the file accumulator, and the others the mail addresses of the other joint file users.

A plurality of instruction buttons including "apply", "return", "cancel" and "clear" are provided on the setting screen shown in FIG. 3 together with the setting input box corresponding to each item. By clicking the "apply" button after setting each item, the data file is accumulated in a specified box of the MFP 10 while at the same time registering the specific setting of each item as related to each other.

The contents remotely set using the web browser at the terminals 2, 3, 4 connected to the network 1 or the contents directly set from the operating unit 14 of the MFP are managed after being registered so that the contents are sequentially added to the "one-touch registration management table" as shown in FIG. 4 and "file management table" as shown in FIG. 5 previously defined in the MFP 10. The "one-touch registration management table" is for managing the "one-touch name" set arbitrarily by each user as related to "box name" and "deletion confirming mail address". In the "one-touch registration management table" shown in FIG. 4, for example, the box name "Confidential" and the deletion confirming mail addresses "yama@konicaminolta.jp", "matsu@konicaminolta.jp" and "ima@konicaminolta.jp" are managed as related to the one-touch name "yamahata" associated with the one-touch number "0". Also, the box name "NM" and the deletion confirming mail addresses "ima@konicaminolta.jp", "kawabe@konicaminolta.jp", "sakai@konicaminolta.jp", "kondo@konicaminolta.jp", "naka@konicaminolta.jp" and "takagi@konicaminolta.jp" are managed as related to the one-touch name "imamura" associated with the one-touch number "2".

The "file management table", on the other hand, is for managing the data file accumulated in a predetermined box as related to the "deletion confirming mail address". The "file management table" shown in FIG. 5, for example, is related to the box "Confidential" and intended to manage the deletion confirming mail addresses "yama@konicaminolta.jp", "matsu@konicaminolta.jp" and "ima@konicaminolta.jp" as related to the data file having the file name "20040901134927.tif" associated with the file number "0", and the deletion confirming mail addresses "sugi@konicaminolta.jp" and "matsu@konicaminolta.jp" as related to the data file having the file name "20040914082155.pdf" associated with the file number "1".

The various information managed in the "one-touch registration management table" and the "file management table" described above as related to the data file accumulated in the MFP 10 are deleted at the same time as the corresponding data file.

Figure 6:
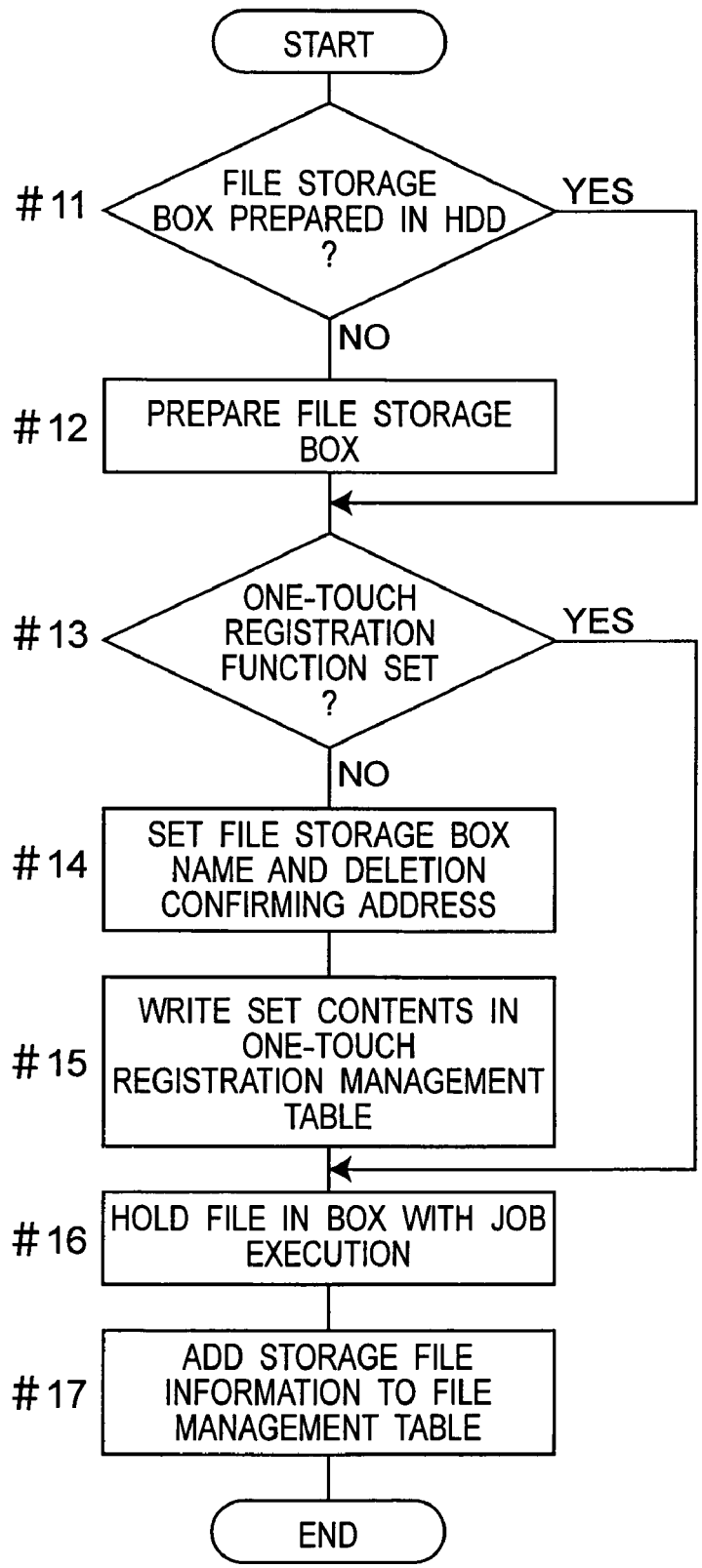
FIG. 6 is a flowchart showing the data file accumulation process executed by the MFP.

FIG. 6 is a flowchart showing the process executed by the MFP 10 to accumulate the data file in a predetermined box while setting the one-touch registration function. In this process, first, it is determined whether a box providing a file storage has been prepared in the hard disk drive 17 (#11). In the case where it is determined that the box providing the file storage has been so prepared, the process proceeds to step #13, while in the case where it is determined that the box providing the file storage has not yet been so prepared, on the other hand, a box providing the file storage is created in the hard disk drive 17. (#12).

After step #12, it is determined whether the one-touch registration function has been set for the box providing a file storage (#13), and in the case where it is determined that the one-touch registration function has been set, the process proceeds to step #16. In the case where it is determined that the one-touch registration function has yet to be set, on the other hand, the name "user box name" of the box providing a file storage and the "deletion confirming mail address" providing a contact address for deletion confirmation with the file accumulator and the other joint file users are set (#14). Next, the contents set at step #14 are written in the one-touch registration management table as shown in FIG. 4 (#15).

After that, upon execution of the job by reading the original through the scanning unit 15, the data file created with the job execution is stored in the box providing the file storage (#16). The information on the data file stored in the box is added to the file management table as shown in FIG. 5 (#17). Thus, the process is terminated.

FIG. 7 is a flowchart of the process executed by the MFP 10 in response to a request to delete the data file accumulated as related to the deletion confirming mail address as described above. In this process, first, it is determined whether a file deletion request has been received from someone such as one of the joint file users (#21). In the case where it is determined that no data file deletion request has been received, step #21 is repeated. In the case where it is determined that a data file deletion request has been received, on the other hand, the deletion confirming mail address registered as related to the data file to be deleted is acquired from the file management table as shown in FIG. 5 (#22).

After step #22, a deletion confirming mail is transmitted to the acquired deletion confirming mail address (#23). At the same time, a timer for checking the period before receiving a response notice begins to count (#24). After that, it is determined whether a deletion NG mail is received from the destination of the deletion confirming mail within a predetermined time To counted by the response notice receipt check period timer (#25). In the case where it is determined that a deletion NG mail has been so received, the data file deletion is canceled (#26). In the case where it is determined that the deletion NG mail is not so received, i.e. a deletion OK mail is received or no response mail is received, on the other hand, the data file is deleted (#27). Then, the process is terminated.

This process may be started not necessarily after determining whether a file deletion request has been received from someone (#21). As an alternative, in the case where the data file accumulation period is set in advance, for example, the process of and subsequent to step #22 may be executed upon lapse of the accumulation time. For this process, the technique disclosed in Japanese Patent Laid-open Publication No. 2004-240511 may be used as a method to prepare the deletion confirming mail and a method to identify the mail received from a terminal in response to the deletion confirming mail.

As described above, the MFP 10 sends the deletion confirming mail to the file accumulator and the other joint file users based on the mail addresses of the joint file users set and registered in advance in response to a data file deletion request. When the deletion NG mail is returned, the data file deletion is canceled and therefore the unauthorized cancellation of the data file shared by a plurality of users can be avoided. Also, the, transmission of the deletion confirming mail is expected to promote the use of the data file by the joint file users who have yet to access the data file to be deleted.

Modification 1

Unlike in the embodiment described above in which the deletion confirming mail is sent to all the joint file users in response to a data file deletion request, the deletion confirming mail may be transmitted to only those joint file users who have not accessed the particular data file during the period from the data file accumulation to the transmission of the deletion confirming mail to the joint file users.

In such a case, it is necessary to specify the joint file users who have already accessed the data file. According to the first modification, the mail address of a regular user of the MFP 10 can be registered in addition to the user ID and the password for personal authentication of the particular regular user registered to limit the use of the MFP 10. In the case where the data file accumulated in a predetermined box in a manner capable of being shared by the joint file users is accessed by a given joint file user, the mail address registered by the particular joint file user in advance as related to user ID and password input before using the MFP 10 is acquired. This mail address is recorded as a "mail address of the joint file user who has accessed the file" as a data corresponding to the data file. As a result, the joint file users who have already accessed the data file can be identified. Also, the deletion confirming mail can be sent to only the other joint file users, i.e. the joint file users who have not yet accessed the data file, in response to a data file deletion request.

FIG. 8 shows a file management table in which the mail addresses of the joint file users who have already accessed the file and the corresponding data files. In this "one-touch registration management table", for example, the mail address "matsu@konicaminolta.jp" of a joint file user who has already accessed the file is recorded in addition to the deletion confirming mail addresses "yamakonicaminolta.jp", "matsu@konicaminolta.jp" and "ima@konicaminolta.jp" as data corresponding to the data file having the file name "20040901134927.tif" associated with file No. 0. Also, the mail address "sugi@konicaminolta.jp" of a joint file user who has already accessed the file is recorded in addition to the deletion confirming mail addresses "sugi@konicaminolta.jp" and "matsu@konicaminolta.jp" as data corresponding to the data file having the file name "20040914082155.pdf" associated with file No. 1.

In this way, the deletion confirming mail is sent only to the joint file users who have not yet accessed the file, in response to a data file deletion request, and therefore the deletion confirming mail is prevented from being sent needlessly from the MFP 10. Also, the joint file users who have already accessed data file can avoid the trouble of confirming the deletion confirming mail.

Modification 2

In the embodiment as described above, the data file deletion is canceled in the case where the deletion NG mail is returned from the destination of the deletion confirming mail. As an alternative, the deletion is suspended upon receipt of the deletion NG mail, and upon lapse of a predetermined length of time therefrom, the deletion confirming mail is sent again. To realize this method, in the MFP 10, upon receipt of the deletion NG mail returned from any destination of the deletion confirming mail, the data file deletion is suspended, while at the same time recording the date when the deletion is suspended (hereinafter referred to as the file deletion suspension day) and the time and hour when the next data file deletion is tried (hereinafter referred to as the next deletion execution day/hour) are recorded with the corresponding data file. A predetermined length of period is set in advance as a suspension period from the file deletion suspension day to the next deletion execution day/hour, and this suspension period is added to the file deletion suspension day to determine the next deletion execution day/hour. The suspension period can be set only by the manager of the MFP 10 by the number of days or hours.

According to this second modification, a deletion suspension file management table is configured in which upon receipt of the deletion NG mail from the destination of the deletion confirming mail for each data file, the file deletion suspension day and the next deletion execution day are recorded with a corresponding data file. FIG. 9 shows an example of the deletion suspension file management table. In this case, the suspension period from the file deletion suspension day to the next deletion execution day/hour is set to "5 days", and the next deletion execution day/hour to "15:00 on the fifth day" after the file deletion suspension day. Specifically, the table shown in FIG. 9 carries the deletion suspension file number "0", and as a data corresponding to the data file of the file name "20040813101442.pdf" accumulated in the box of the box name "Confidential", the file deletion suspension day "2004/09/20" and the next deletion execution day/hour "2004/09/25__15:00" are recorded. Also, as a data corresponding to the data file carrying the deletion suspension file number "1" and the file name "20040825185532.tif" accumulated in the box having the box name "Confidential", the file deletion suspension day "2004/09/23" and the next deletion execution day/hour "2004/09/28__15:00" are recorded.

In this way, upon receipt of the deletion NG mail, the deletion of the data file is suspended, and upon lapse of a predetermined period from the suspension, the deletion confirming mail is sent again. Thus, the data file deletion is promoted and the burden on the hard disk drive 17 of the MFP 10 can be reduced.

In the table shown in FIG. 9, a set of the file deletion suspension day and the next deletion execution day/hour is recorded with one corresponding data file. Actually, however, based on this table, different file deletion suspension days and different next deletion execution days/hours are recorded for different senders of the deletion NG mail, and the deletion confirming mail is sent based on each information. Once the deletion NG mail ceases to be returned from all the destinations of the deletion confirming mail, the data file is deleted. Although a predetermined suspension period (5 days) is applied for all the data files in the table shown in FIG. 9, the suspension period is not limited to this length, but different suspension periods may be set for different data files.

Modification 3

The third modification is designed to combine the first and second modifications described above. Specifically, in the MFP 10 according to the third modification, the deletion confirming mail is sent only to the joint file users who have yet to access the data file to be deleted, after which upon receipt of the deletion NG mail, the data file deletion is suspended, and upon lapse of a predetermined period following the suspension, the deletion confirming mail is sent again.

Figure 10:
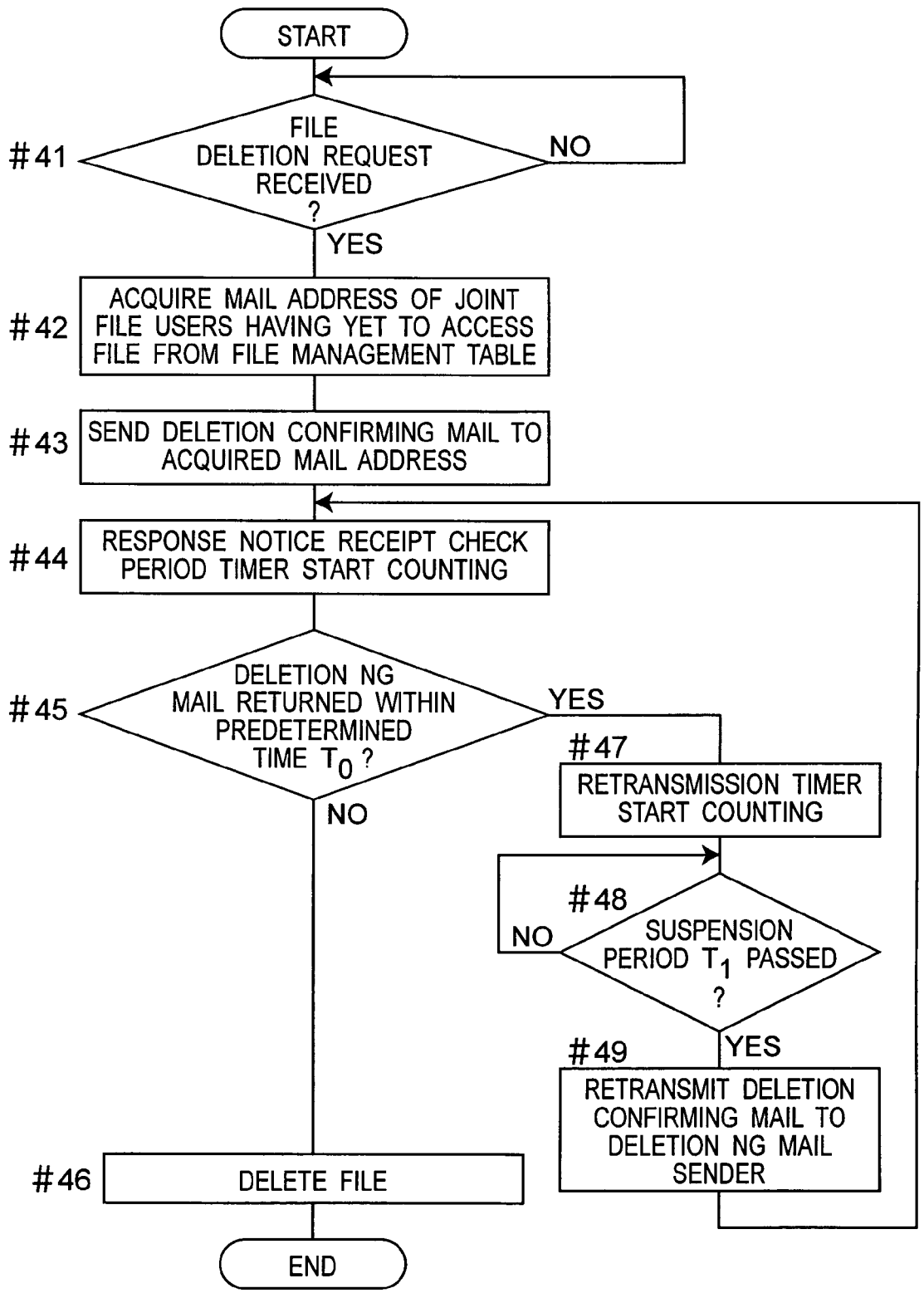
FIG. 10 is a flowchart showing the data file deletion process executed by the MFP according to yet another embodiment (third modification) of the invention.

FIG. 10 is a flowchart showing the process executed in response to a data file deletion request from the MFP 10. In this process, first, it is determined whether a file deletion request has been received or not (#41). In the case where it is determined that the file deletion request is not received, step #41 is repeated, while in the case where it is determined that a file deletion request has been received, on the other hand, the mail addresses of the joint file users who have yet to access the data file are acquired based on the file management table shown in FIG. 8 (#42).

After step #42, the deletion confirming mail is sent to the acquired mail addresses (#43). Then, the response notice receipt check period timer begins to count (#44). Further, it is determined whether the deletion NG mail is returned from the joint file users within a predetermined period $T_0$ or not (#45).

In the case where #45 determines that the deletion NG mail has been returned, the retransmission timer begins to count (#47), after which it is determined whether a predetermined suspension time $T_1$ has passed or not (#48). In the case where it is determined that the suspension period $T_1$ has not passed, step #48 is repeated. In the case where it is determined that the suspension period $T_1$ has passed, on the other hand, the deletion confirming mail is sent again to the sender of the deletion NG mail (#49).

In the case where step #45 determines that no deletion NG mail is returned, on the other hand, the data file is deleted (#46). Thus, the process is terminated.

As described above, the deletion confirming mail is sent only to the joint file users who have yet to access the data file to be deleted, after which upon receipt of the deletion NG mail, the data file deletion is suspended. Upon lapse of a predetermined time from the suspension, the deletion confirming mail is sent again. In this way, the advantage of the first modification that the deletion confirming mail is prevented from being needlessly sent from the MFP 10 while at the same time obviating the trouble on the part of the joint file users who have already accessed the data file to read the deletion confirming mail and the advantage of the second modification that the deletion of the data file is promoted thereby to reduce the burden on the hard disk drive 17 of the MFP 10 can be achieved at the same time.

Modification 4

In the second and third modifications as described above, the deletion confirming mail is sent repeatedly to the sender of the deletion NG mail always after a predetermined suspension period. As an alternative, the suspension period can be set progressively shorter to send the deletion confirming mail at constantly shorter timings. In the deletion suspended file management table of FIG. 9, for example, the next deletion execution day/hour is set at 15:00 on the fifth day from the file deletion suspended day. In the case where the deletion NG mail is returned again in response to the deletion confirming mail sent again on the next deletion execution day/hour, the data file deletion suspension period from the data file deletion suspension day may be one day shorter than the previous suspension period. In other words, the next deletion execution day is set at 15:00 on the fourth day. In this way, each time the file deletion is suspended, the next deletion execution day/hour is set one day shorter than the immediately preceding suspension period.

In order to realize this schedule, in the MFP 10 according to the fourth modification, the number of times the data file deletion is suspended is counted, and the count is held. This count, together with the "file deletion suspended day" and the "next deletion execution day/hour", is recorded with a corresponding data file in the deletion suspension file management table shown in FIG. 9. In suspending the data file deletion, the count recorded is referred to, so that the file deletion suspension period is determined by subtracting the number of days corresponding to the count from the maximum file deletion suspension period (say, 5 days). In this case, the minimum file deletion suspension period is defined as one day, and the suspension period, once reduced to one day, remains unchanged.

Figure 11:
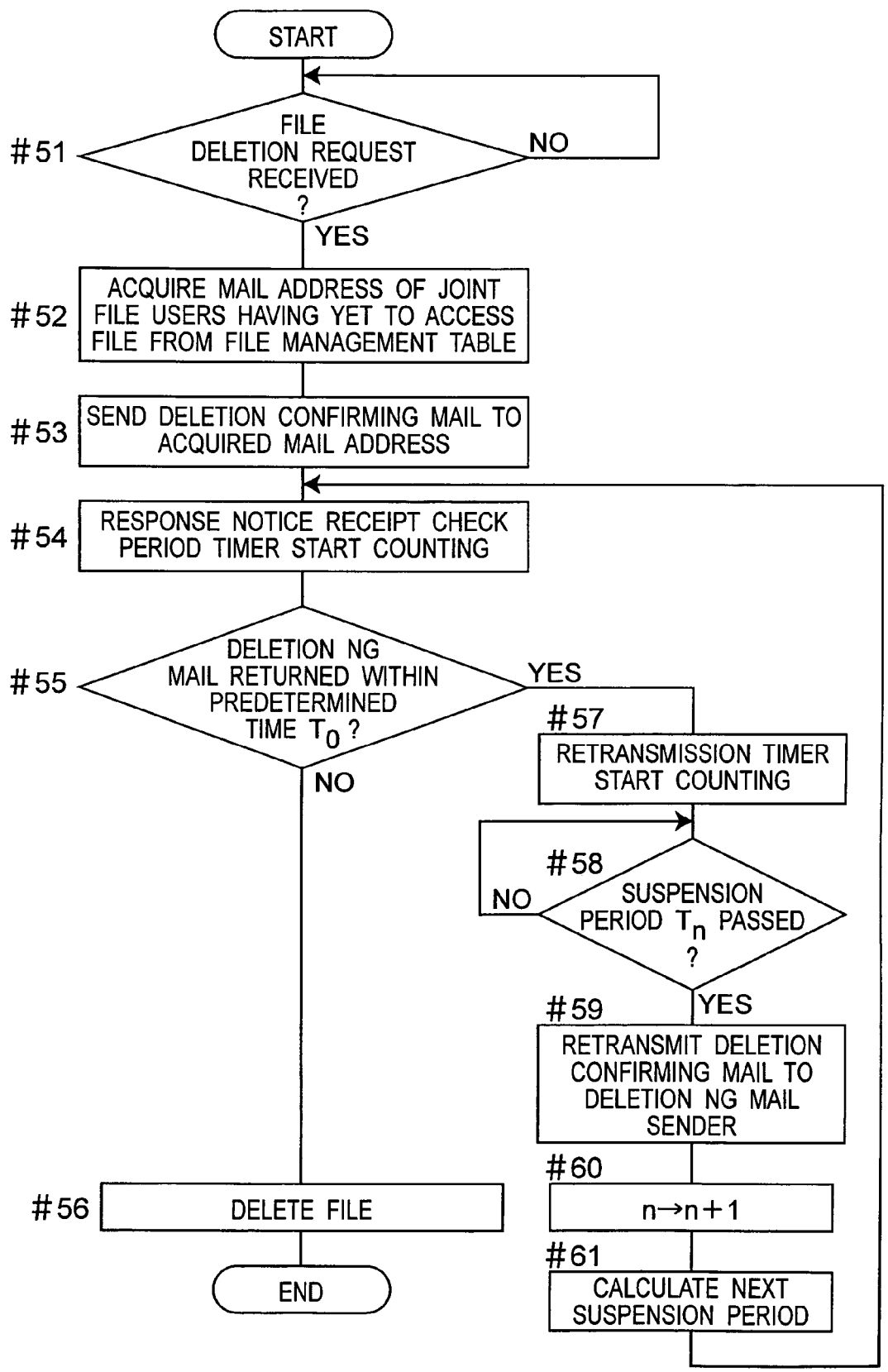
FIG. 11 is a flowchart showing the data file deletion process executed by the MFP according to a further embodiment (fourth modification) of the invention.

FIG. 11 is a flowchart showing the process executed in response to a data file deletion request from the MFP 10 according to the fourth modification. Steps #51 to #56 in FIG. 11 are similar to steps #41 to #45 in FIG. 10 and therefore not described again. In the case where step #55 determines that the deletion NG mail is returned, the retransmission timer begins to count (#57). After step #57, it is determined whether the suspension time $T_n$ has passed or not (#58), and in the case where it is determined that the suspension time $T_n$ has not passed, step #58 is repeated. In the case where it is determined that the suspension time $T_n$ has passed, on the other hand, the deletion confirming mail is sent again to the sender of the deletion NG mail (#59). Then, the count n of the number of times the deletion is suspended is incremented by one (#60), and based on this count, the suspension period $T_n$ is calculated in preparation for the retransmission of the next deletion confirming mail (#61). After that, the process returns to step #54 and the subsequent steps are repeated.

In the case where the retransmission of the deletion confirming mail is repeated as described above, the data file deletion suspension period is set progressively shorter, and therefore the data file can be deleted at progressively shorter time intervals.

According to the embodiment described above, the data file deletion is canceled or after being temporarily suspended, the deletion confirming mail is sent again in response to the return of the deletion NG mail. This invention, however, is not limited to this aspect. As an alternative, for example, a mail accompanied by the data file to be deleted is sent to the deletion NG mail sender, and upon lapse of a predetermined period from the time when the mail is sent, the data file may be deleted. In this case, the mail accompanied by the data file to be deleted such as the one containing a comment as "We are sending the data file to be deleted" is automatically prepared.

Thus, the joint file users who have returned the deletion NG mail can positively acquire the data file.

Modification 5

According to the embodiments as described above, in response to a data file deletion request, the deletion confirming mail is sent to the joint file users, and thus the joint file users who have not yet accessed the data file are prevented from failing to acquire the data file. As an alternative, in response to the data file deletion request, the data file may be deleted while at the same time notifying the file accumulator of the presence of a joint file user who has not yet accessed the data file together with the mail address of the particular joint file user.

To realize this, the MFP 10 according to the fifth modification is configured of a "one-touch registration management table" as shown in FIG. 12 to make it possible to specify the mail address of the file accumulator. In this table, unlike the tables shown in FIGS. 4, 5, 8 for managing the mail addresses of the file accumulator and the other joint file users collectively as a deletion confirming mail, the mail address of the file accumulator is managed separately from the mail address of the joint file users. Also, in this case, like in the first modification, the "file management table" as shown in FIG. 13 is configured to make it possible to specify the joint file users who have yet to access the data file. In other words, in the table shown in FIG. 13, the mail addresses of the joint file users who have already accessed the data file are recorded as the "file-accessed joint file user mail addresses" with corresponding data files.

In the MFP 10, in response to a data file deletion request, the deletion is carried out, and at the same time, the mail addresses other than the "file-accessed joint file user mail addresses" recorded in the "file management table" as shown in FIG. 13 are acquired. After that, with the comment "The following users have not yet accessed the data file 20040924180301.tif", for example, a mail accompanied by these mail addresses is automatically prepared and sent to the mail address of the file accumulator. The file accumulator who has received this notification subsequently sends a mail to the mail addresses attached to the received mail, and thereby notifies the execution of the deletion to the joint file users who have not yet accessed the data file. In the case where the file accumulator holds the particular data file, on the other hand, the data file is supplied by being attached to the mail as required. To provide for the case in which the file accumulator supplies the data file to the joint file users who have not yet accessed the data file, the notice mail from the MFP 10 to the file accumulator may be accompanied by the data file to be deleted.

As described above, the MFP 10 executes the deletion in response to a data file deletion request, while at the same time notifying the joint file users who have not yet accessed the data file. After that, the file accumulator notifies the data file deletion to the joint file users who have not yet accessed the data file, and at the same time supplies them with the data file to be deleted. As a result, the file accumulator makes it possible for the joint file users who have yet to access the data file to acquire the file.

The deletion process shown in the flowcharts of FIGS. 7, 10, 11 is executed by reading the program stored in the MFP 10. This program may be built in as a part of the program providing the basis of the control operation by the CPU 11 of the MFP 10 or may be stored additionally in the MFP 10 as a data file management program by using an external recording medium such as a CD-ROM (not shown) or a floppy disk (registered trade mark) or by being downloaded through a network.

This invention is not limited to the embodiments illustrated above, and without departing from the spirit of the invention, can of course be variously corrected or modified in design.

What is claimed is:

1. A data file management apparatus connected to a network and having the function of accumulating a data file that can be shared by a plurality of users, comprising:

a register for registering address information of a plurality of joint file users permitted to share the data file while being related to the data file at the time of accumulating the data file;

a transmitter for transmitting a message to confirm the consent of the joint file users about the data file deletion to the address information registered in the register in response to a data file deletion request, wherein the transmitter transmits the message only to the address information of the joint file users who have not yet accessed the data file to be deleted; and a deletion controller for not executing the data file deletion in the case where a message not consenting to the deletion of the data file is returned from any of the joint file users within a predetermined period from the message transmission by the transmitter and executing the data file deletion in the case where no message is received from the joint file users within the predetermined period, wherein the transmitter, upon receipt of the message not consenting to the data file deletion from the joint file users and upon lapse of a predetermined length of time from the receipt, transmits the message again to confirm the consent of the joint file users about the data file deletion.

2. The data file management apparatus according to claim 1, wherein the transmitter progressively shortens a timing of transmitting each message to confirm the consent of the joint file users about the data file deletion.

3. The data file management apparatus according to claim 1, wherein the transmitter transmits a data file to be deleted to the sender of the message not consenting to the data file deletion, and wherein the deletion controller deletes the data file after the transmitter transmits the data file to be deleted.

4. An image forming apparatus in which an image data file is generated by reading an original document, the apparatus being connected to a network and having the function of accumulating the image data file that can be shared by a plurality of users, comprising:

a register for registering address information of a plurality of joint file users permitted to share the image data file while being related to the image data file at the time of accumulating the image data file;

a transmitter for transmitting a message to confirm the consent of the joint file users about the image data file deletion to the address information registered in the register in response to an image data file deletion request, wherein the transmitter transmits the message only to the address information of the joint file users who have not yet accessed the image data file to be deleted; and a deletion controller for not executing the image data file deletion in the case where a message not consenting to the deletion of the image data file is returned from any of the joint file users within a predetermined period from the message transmission by the transmitter and executing the image data file deletion in the case where no message is received from the joint file users within the predetermined period, wherein the transmitter, upon receipt of the message not consenting to the image data file deletion from the joint file users and upon lapse of a predetermined length of time from the receipt, transmits a message again to confirm the consent of the joint file users about the image data file deletion.

5. The image forming apparatus according to claim 4, wherein the transmitter progressively shortens a timing of transmitting each message to confirm the consent of the joint file users about the image data file deletion.

6. The image forming apparatus according to claim 4, wherein the transmitter transmits an image data file to be deleted to the sender of the message not consenting to the image data file deletion, and wherein the deletion controller deletes the image data file after the transmitter transmits the image data file to be deleted.

7. A method of managing a data file in an apparatus connected to a network and having the function of accumulating a data file that can be shared by a plurality of users, the method comprising the steps of:
registering address information of a plurality of joint file users permitted to share the data file while being related to the data file at the time of the data file accumulation;
transmitting a message to confirm the consent of the joint file users about the data file deletion to the registered address information in response to a data file deletion request, wherein the message is only transmitted to the address information of the joint file users who have not yet accessed the data file to be deleted;
not executing the data file deletion in the case where a message not consenting to the data file deletion is returned from any of the joint file users within a predetermined period from the confirming message transmission and executing the data file deletion in the case where no message is received from the joint file users within the predetermined period; and
transmitting a message again to confirm the consent of the joint file users about the image data file deletion upon receipt of the message not consenting to the image data file deletion from the joint file users and upon lapse of a predetermined length of time from the receipt.

8. A recording medium for recording a data file management program in a data file management apparatus connected to a network and having the function of accumulating a data file that can be shared-by a plurality of users, comprising the steps of:
registering address information of a plurality of the joint file users permitted to share the data file while being related to the data file at the time of the data file accumulation;
transmitting a message to confirm the consent of the joint file users about the data file deletion to the registered address information in response to a data file deletion request, wherein the message is only transmitted to the address information of the joint file users who have not yet accessed the data file to be deleted;
not executing the data file deletion in the case where a message not consenting to the data file deletion is returned from any of the joint file users within a predetermined period from the confirming message transmission and executing the data file deletion in the case where no message is received from the joint file users within the predetermined period; and
transmitting a message again to confirm the consent of the joint file users about the image data file deletion upon receipt of the message not consenting to the image data file deletion from the joint file users and upon lapse of a predetermined length of time from the receipt.

* * * * *